(12) United States Patent
Oohashi et al.

(10) Patent No.: US 6,809,437 B2
(45) Date of Patent: Oct. 26, 2004

(54) AUTOMOTIVE ALTERNATOR

(75) Inventors: Atsushi Oohashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 90 days.

(21) Appl. No.: 09/962,340

(22) Filed: Sep. 26, 2001

(65) Prior Publication Data

US 2002/0096958 A1 Jul. 25, 2002

(30) Foreign Application Priority Data

Jan. 19, 2001 (JP) ........................................ 2001-012205

(51) Int. Cl.⁷ ............................. H02K 3/24; H02K 19/16
(52) U.S. Cl. ........................ 310/45; 310/260; 310/201
(58) Field of Search ................................. 310/179, 180, 310/84, 192, 194, 261, 270, 263, 45, 201

(56) References Cited

U.S. PATENT DOCUMENTS

| | | | | |
|---|---|---|---|---|
| 3,808,514 A | * | 4/1974 | Wesemeyer ................. 320/137 |
| 4,267,475 A | * | 5/1981 | Vitchenko et al. ........... 310/232 |
| 4,752,533 A | * | 6/1988 | Sassano ....................... 428/480 |
| 5,274,322 A | | 12/1993 | Hayashi et al. |
| 5,955,810 A | * | 9/1999 | Umeda et al. .............. 310/208 |
| 6,051,906 A | * | 4/2000 | Umeda et al. .............. 310/179 |
| 6,091,169 A | * | 7/2000 | Umeda et al. ................ 310/62 |
| 6,239,518 B1 | * | 5/2001 | Matsubara et al. ........... 310/58 |
| 6,333,573 B1 | * | 12/2001 | Nakamura .................... 310/45 |
| 6,396,185 B1 | * | 5/2002 | Asao et al. ................. 310/180 |
| 6,429,552 B2 | * | 8/2002 | Asao et al. ................... 310/64 |

FOREIGN PATENT DOCUMENTS

| | | |
|---|---|---|
| EP | 0 751 609 | 1/1997 |
| JP | 4-26345 | 1/1992 |
| JP | 7-213029 A | 8/1995 |
| JP | 2001-211590 A | 8/2001 |

OTHER PUBLICATIONS

Patent Abstracts of Japan, vol. 009, No. 023, Jan. 30, 1985.
Patent Abstracts of Japan, vol. 017, No. 028, Jan. 19, 1993.
Patent Abstracts of Japen, vol. 1997, No. 07, Jul. 31, 1997.
Patent Abstracts of Japan, vol. 002, No. 045, Mar. 27, 198.

* cited by examiner

*Primary Examiner*—Thanh Lam
*Assistant Examiner*—Judson H. Jones
(74) *Attorney, Agent, or Firm*—Sughrue Mion, PLLC

(57) ABSTRACT

A varnish is applied to crossover portions of coil ends of a stator winding such that a space factor of conductor wires and the varnish relative to a cross-sectional area of the crossover portions in a cross section of the crossover portions relative to a plane including an axial center of a stator core is seventy percent (70%) or more, and a ratio occupied by exposed portions of the conductor wires relative to an outer circumference of the crossover portions in the cross section of the crossover portions is fifty percent (50%) or more.

6 Claims, 8 Drawing Sheets

AUTOMOTIVE ALTERNATOR

This application is based on Application No. 2001-012205, filed in Japan on Jan. 19, 2001, the contents of which are hereby incorporated by reference to the extent permitted by United States patent law.

BACKGROUND OF THE INVENTION

1. Field of the Invention

The present invention relates to an automotive alternator and particularly to an automotive alternator in which an electrically-insulating resin is applied to a coil end group of a stator winding to reduce electromagnetic noise caused by vibration of a stator core.

2. Description of the Related Art

Generally, in an automotive alternator, electromagnetic noise is generated by a stator core vibrating in a radial direction during power generation. Thus, conventionally, in order to reduce the electromagnetic noise caused by the vibration of the stator core, countermeasures have been taken to increase rigidity of a stator as a whole by impregnating a varnish into slots to fix the stator core and a stator winding together. According to this countermeasure, because the stator winding is prevented from moving within the slots, damage to an electrically-insulating coating on conductor wires constituting the stator winding resulting from the conductor wires rubbing against an inner wall surface of the slots is suppressed, and withstand voltage between the stator core and the stator winding increases, that is, electrical insulation is also improved.

However, there have been cases where the varnish adhered slightly to coil end groups of the stator winding when impregnating the varnish into the slots, but no thought was given to increasing rigidity of the stator as a whole by actively applying the varnish to the coil end groups. Furthermore, in this countermeasure, because the conductor wires constituting the coil end groups are not fixed to each other, the conductor wires rub against each other due to the vibration, damaging the electrically-insulating coating on the conductor wires, and inducing short-circuiting accidents within and between winding phase portions. In addition, in this countermeasure, narrow gaps are formed between the conductor wires constituting the coil end groups, and because a cooling airflow generated by a cooling fan flows through the narrow gaps, a loud wind noise is generated.

Conventionally, in order to ensure electrical insulation in the coil end groups of the stator winding, countermeasures have been applied to embed the coil end groups entirely in an electrically-insulating resin such as an epoxy resin, etc. In that case, the conductor wires constituting the coil end groups are fixed by the electrically-insulating resin, leading to improved rigidity of the stator as a whole, and gaps between the conductor wires constituting the coil end groups are embedded in the electrically-insulating resin, leading to wind noise reduction.

However, because the coil end groups are embedded entirely in the electrically-insulating resin, heat generated in the stator winding is less likely to dissipate and the stator temperature rises, resulting in decreased output.

Thus, in the conventional automotive alternator, when applying the electrically-insulating resin to the coil end groups of the stator winding, consideration has not been given to both improving rigidity of the stator as a whole and improving cooling of the stator winding. Thus, one problem that has arisen has been that when electromagnetic noise can be reduced, temperature increases in the stator cannot be suppressed. Another problem that has arisen has been that when temperature increases in the stator can be suppressed, electromagnetic noise cannot be reduced.

SUMMARY OF THE INVENTION

The present invention aims to solve the above problems and an object of the present invention is to provide an automotive alternator enabling electromagnetic noise to be reduced while also ensuring cooling of a stator by regulating a space factor of an electrically-insulating resin and conductor wires constituting crossover portions of a coil end group of a stator winding relative to a cross-sectional area of the crossover portions from the viewpoint of electromagnetic noise, and regulating a ratio occupied by exposed portions of conductor wires relative to an outer circumference of the cross section of the crossover portion from the viewpoint of cooling of the stator winding.

In order to achieve the above object, according to one aspect of the present invention, there is provided an automotive alternator including:

a shaft rotatably supported in a case;

a rotor fixed to the shaft;

a stator provided with:

a cylindrical stator core supported in the case so as to envelop the rotor, a plurality of slots extending axially being formed in the stator core so as to line up circumferentially; and a stator winding composed of a polyphase alternating-current winding installed in the stator core; and a cooling fan fixed to at least one axial end portion of the rotor, the polyphase alternating-current winding being constituted by winding phase portions each being constructed by winding a conductor wire for a predetermined number of turns into a wave shape in the slots at intervals of a predetermined number of slots so as to extend outwards from first slots at an end surface of the stator core, extend in a circumferential direction, and enter second slots the predetermined number of slots away, the conductor wire being formed by coating an electrical conductor with electrical insulation, slots in which each of the winding phase portions is installed being offset by one slot from slots in which other of the winding phase portions are installed, coil ends of the winding phase portions each being constituted by extended portions composed of portions of the conductor wire extending outwards at an end surface of the stator core from a pair of the slots the predetermined number of slots apart, and a crossover portion composed of a portion of the conductor wire extending in a circumferential direction and linking the extended portions extending outwards at the end surface of the stator core from the pair of the slots the predetermined number of slots apart, a coil end group of the stator winding being constructed by arranging the coil ends of the winding phase portions circumferentially such that the crossover portions overlap radially, and an electrically-insulating resin being applied to the crossover portions so as to fix together the radially-overlapping crossover portions, wherein a space factor of the conductor wires and the electrically-insulating resin relative to a cross-sectional area of the crossover portions in a cross section of the crossover portions relative to a plane including an axial center of the stator core is seventy percent (70%) or more, and a ratio occupied by exposed portions of the conductor wires relative to an outer circumference of the crossover portions in the cross section of the crossover portions is fifty percent (50%) or more.

The electrically-insulating resin may be impregnated inside the slots.

The electrically-insulating resin may be a varnish.

The electrically-insulating resin may be a silicone resin.

The slots may be formed at a ratio of two per phase per pole, the polyphase alternating-current winding being constituted by two three-phase alternating-current windings each formed by connecting three of the winding phase portions into an alternating-current connection.

Each of the winding phase portions may be formed into a divided winding portion.

BRIEF DESCRIPTION OF THE DRAWINGS

FIGS. 13A–C are cross sectional views of crossover portions showing a ratio occupied by the exposed portions of conductor wires relative to the outer circumference of a respective crossover portion, wherein FIG. 13A shows a ratio of 30%, FIG. 13B shows a ratio of 50%, and FIG. 13C shows a ratio of 70%.

DETAILED DESCRIPTION OF THE PREFERRED EMBODIMENTS

The preferred embodiments of the present invention will now be explained with reference to the drawings.

Embodiment 1

Figure 1:
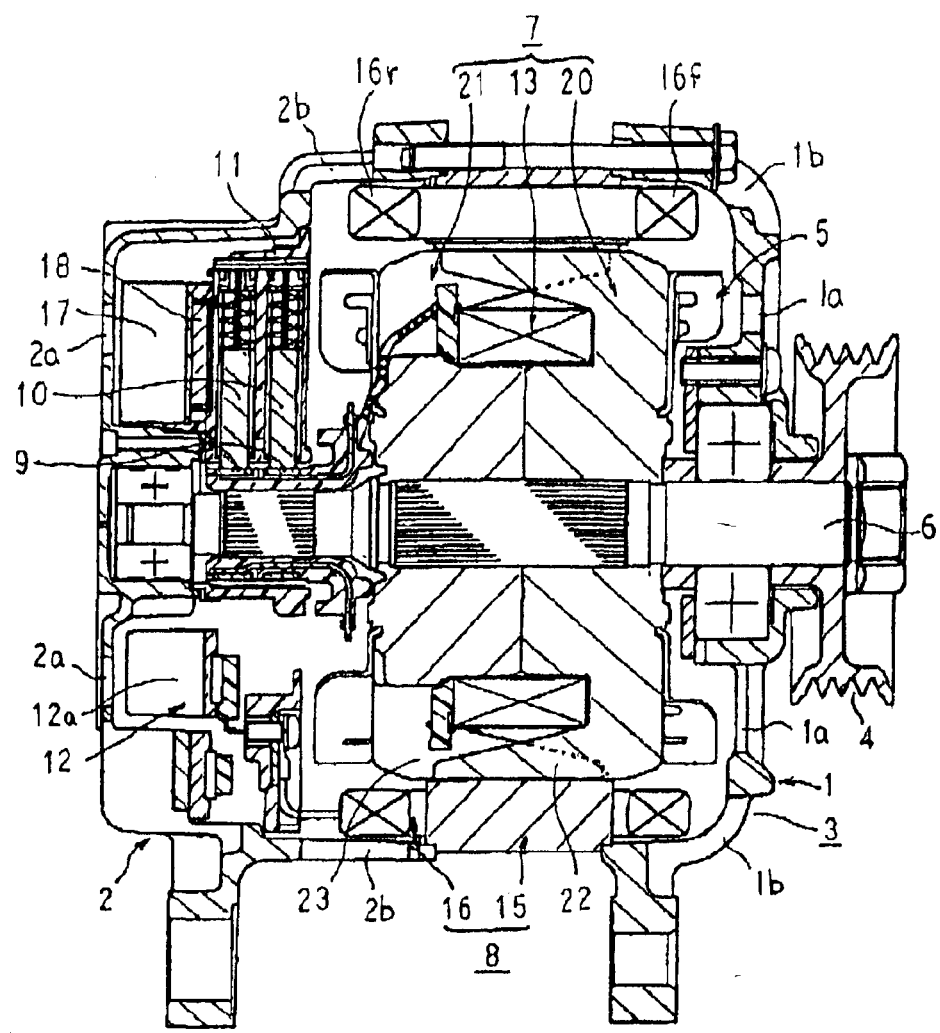
FIG. 1 is a cross section showing an automotive alternator according to Embodiment 1 of the present invention.
Figure 2:
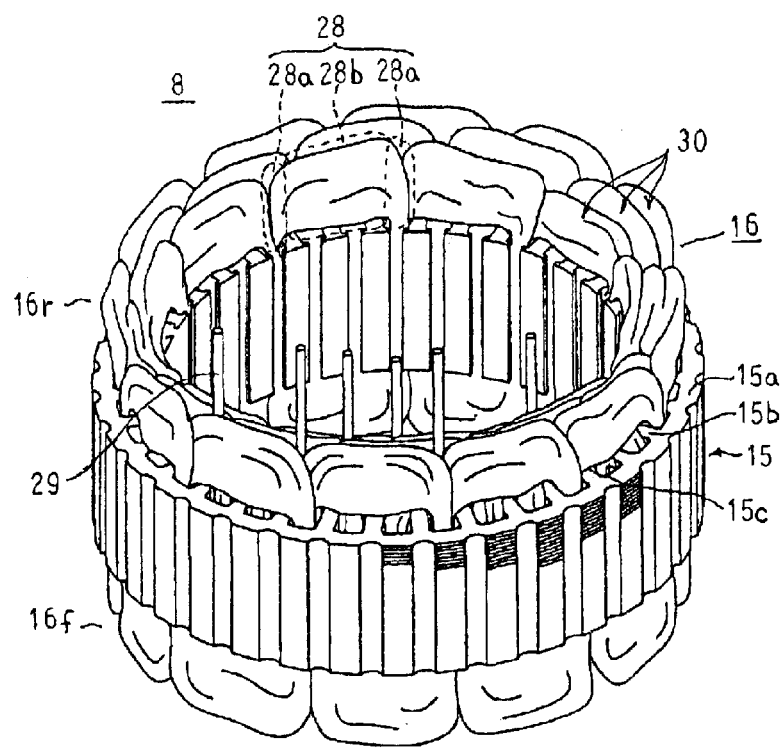
FIG. 2 is a perspective showing a stator used in the automotive alternator according to Embodiment 1 of the present invention.
Figure 3:
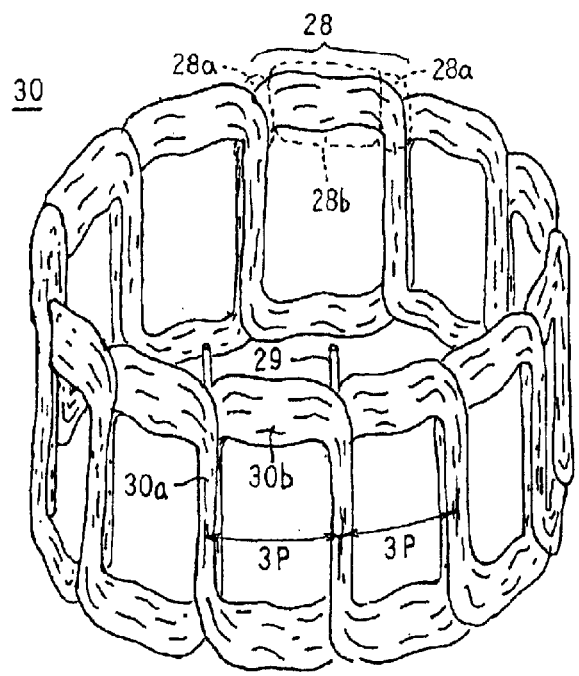
FIG. 3 is a perspective schematically showing one winding phase portion constituting a stator winding of the stator used in the automotive alternator according to Embodiment 1 of the present invention.
Figure 4:
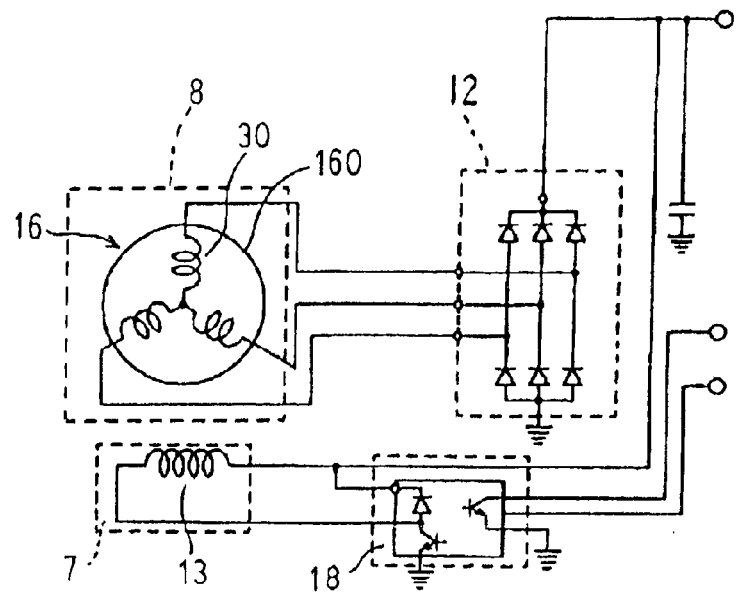
FIG. 4 is a circuit diagram of the automotive alternator according to Embodiment 1 of the present invention.

FIG. 1 is a cross section showing an automotive alternator according to Embodiment 1 of the present invention, FIG. 2 is a perspective showing a stator used in the automotive alternator according to Embodiment 1 of the present invention, FIG. 3 is a perspective schematically showing one winding phase portion constituting a stator winding of the stator used in the automotive alternator according to Embodiment 1 of the present invention, and FIG. 4 is a circuit diagram of the automotive alternator according to Embodiment 1 of the present invention.

In FIGS. 1 to 3, the automotive alternator includes: a case 3 constituted by an aluminum front bracket 1 and an aluminum rear bracket 2; a shaft 6 disposed inside the case 3 having a pulley 4 secured to a first end thereof; a Lundell-type rotor 7 secured to the shaft 6; cooling fans 5 secured to first and second axial end surfaces of the rotor 7; a stator 8 secured to the case 3 so as to envelop the rotor 7; slip rings 9 secured to a second end of the shaft 6 for supplying an electric current to the rotor 7; a pair of brushes 10 sliding on surfaces of the slip rings 9; a brush holder 11 accommodating the brushes 10; a rectifier 12 electrically connected to the stator 8 for converting an alternating current generated in the stator 8 into a direct current; and a regulator 18 mounted to a regulator heat sink 17 fitted onto the brush holder 11, the regulator 18 adjusting the magnitude of the alternating voltage generated in the stator 8.

The rotor 7 is constituted by a field winding 13 for generating a magnetic flux on passage of an electric current, and a pair of first and second pole cores 20 and 21 disposed so as to cover the field winding 13, magnetic poles being formed in the first and second pole cores 20 and 21 by magnetic flux generated in the field winding 13. The pair of first and second pole cores 20 and 21 are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh.

The stator 8 is constituted by: a cylindrical stator core 15 prepared by laminating a predetermined number of sheets of a magnetic steel plate; and a stator winding 16 installed in the stator core 15. The stator 8 is held between the front bracket 1 and the rear bracket 2 so as to form a uniform air gap between outer circumferential surfaces of the claw-shaped magnetic poles 22 and 23 and an inner circumferential surface of the stator core 15.

The stator core 15 includes: a cylindrical base portion 15a; a plurality of tooth portions 15b formed on an inner circumferential surface of the base portion 15a at an even angular pitch in a circumferential direction, each of the tooth portions 15b being disposed so as to extend from the inner circumferential surface of the base portion 15a toward an axial center; and a plurality of slots 15c extending axially defined by the base portion 15b and adjacent pairs of the tooth portions 15b. Here, the number of magnetic poles in the rotor 7 is twelve, and there are thirty-six slots 15c formed at an even angular pitch in a circumferential direction on the stator core 15. In other words, the number of slots per phase per pole is one.

The stator winding 16 is constituted by three winding phase portions 30 each formed by winding a conductor wire 29 for a predetermined number of winds into a wave shape in every third slot 15c so as to extend outwards from a first slot 15c at an end surface of the stator core 15, extend in a circumferential direction, and enter a second slot 15c three slots away, the conductor wire 29 being formed by coating with electrical insulation a copper wire material (an electrical conductor) having a circular cross section. Furthermore, the winding phase portions 30 are installed in the stator core 15 such that the slots 15c in which each winding phase portion 30 is installed are offset by one slot from those of each of the other winding phase portions 30.

A winding construction of the stator winding 16 will now be explained with reference to FIG. 3.

The winding phase portions 30 are each constructed into a wave winding in which the conductor wire 29 is wound for a predetermined number of winds, the winding phase portions 30 each being formed into a divided winding portion having a wave-shaped pattern composed of twelve slot-housed portions 30a disposed at a pitch of three slots (3P) in a circumferential direction and linking portions 30b linking together a first half of end portions of adjacent pairs of the slot-housed portions 30a alternately at first and second axial ends and linking together a remaining second half of the end portions alternately at the first and second axial ends. The winding phase portions 30 are installed in the stator core 15 such that the slot-housed portions 30a are housed in every third slot 15c. Here, a first half of the linking portions 30b extending outwards from any given slot 15c extends to a first circumferential side and enters the next slot 15c three slots away on the first circumferential side, and a remaining second half thereof extends to a second circumferential side and enters the next slot 15c three slots away on the second circumferential side.

As shown in FIG. 2, the three winding phase portions 30 are installed in the stator core 15 such that the slots 15c in which each winding phase portion 30 is installed are offset by a pitch of one slot (1P) in a circumferential direction from those of each of the other winding phase portions 30 and the three winding phase portions 30 are stacked into three layers radially.

Moreover, in each of the winding phase portions 30, coil ends 28 are constituted by the linking portions 30b and are formed by extended portions 28a composed of portions of the conductor wire 29 extending outwards from the slots 15c, and crossover portions 28b composed of portions of the conductor wire 29 extending in a circumferential direction and linking the extended portions 28a extending outwards from pairs of slots 15c three slots apart. The crossover portions 28b of the coil ends 28 of the winding phase portions 30 are stacked radially and arranged circumferentially to constitute front-end and rear-end coil end groups 16f and 16r of the stator winding 16. In addition, a varnish 35 functioning as an electrically-insulating resin, described below, is applied to the crossover portions 28b of the coil end groups 16f and 16r. The varnish 35 is a resin such as polyester resin, etc., dissolved in a solvent, and hardens after application, integrally fixing the strands of the conductor wire 29 constituting the crossover portions 28b, and integrally fixing together the radially-stacked crossover portions 28b.

The three winding phase portions 30 installed in this manner are formed into a Y-connection (an alternating-current connection), constituting a three-phase alternating-current winding 160 functioning as a polyphase alternating-current winding. The three-phase alternating-current winding 160 is connected to the rectifier 12, constituting the electrical circuit shown in FIG. 4.

In an automotive alternator constructed in this manner, an electric current is supplied from a battery (not shown) through the brushes 10 and the slip rings 9 to the field winding 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles.

At the same time, the pulley 4 is driven by the engine and the rotor 7 is rotated by the shaft 6. A rotating magnetic field is applied to the stator core 15 due to the rotation of the rotor 7, generating an electromotive force in the three-phase alternating-current winding 160 of the stator winding 16. The alternating electromotive force generated in the three-phase alternating-current winding 160 is converted into direct current by the rectifier 12 and the magnitude of the output voltage thereof is adjusted by the regulator 18, recharging the battery.

Here, the cooling fans 5 are rotated and driven by the rotation of the rotor 7. Due to the rotation of the cooling fans 5, cooling airflow channels are formed in which external air is sucked inside the case 3 through front-end and rear-end air intake apertures 1a and 2a, flows axially towards the rotor 7, thereafter is deflected centrifugally by the cooling fans 5, and is discharged through front-end and rear-end air discharge apertures 1b and 2b. Heat generated in the rectifier 12 and the regulator 18 is dissipated from a rectifier heat sink 12a and the regulator heat sink 17 to a cooling airflow flowing through the cooling airflow channels, suppressing temperature increases in the rectifier 12 and the regulator 18. Furthermore, heat generated in the stator winding 16 is dissipated from the coil end groups 16f and 16r to cooling airflows, suppressing temperature increases in the stator 8. Moreover, a cooling airflow flows through the inside of the rotor 7 as a result of a pressure difference between a front end and a rear end of the rotor 7, dissipating heat generated in the field winding 13, thereby suppressing temperature increases in the rotor 7.

Figure 5:
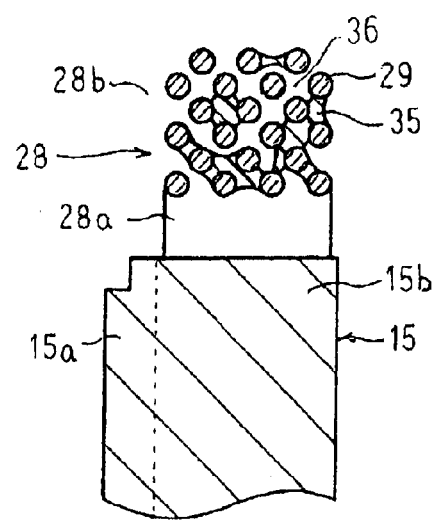
FIG. 5 is a cross section explaining an applied state of a varnish in the stator of the automotive alternator according to Embodiment 1 of the present invention.
Figure 6:
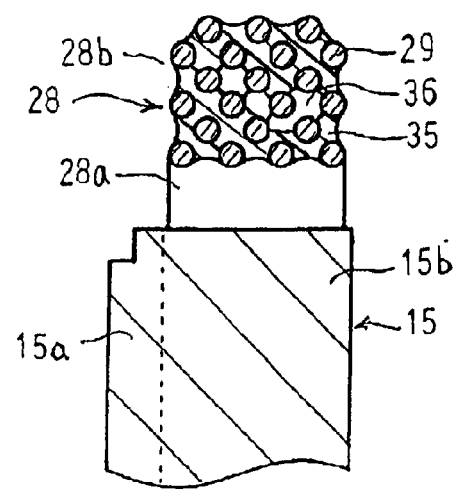
FIG. 6 is another cross section explaining the applied state of the varnish in the stator of the automotive alternator according to Embodiment 1 of the present invention.
Figure 7:
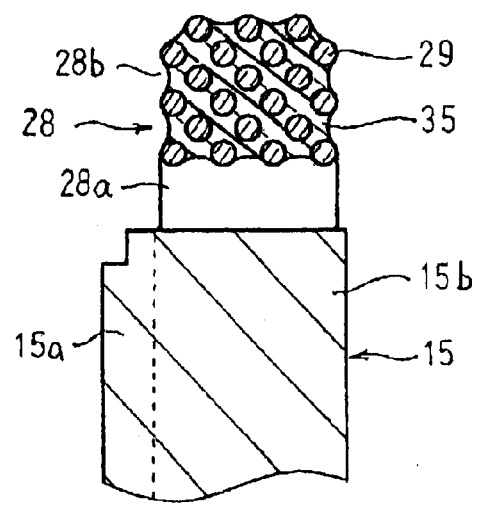
FIG. 7 is yet another cross section explaining the applied state of the varnish in the stator of the automotive alternator according to Embodiment 1 of the present invention.

Next, the applied state of the varnish 35 in the crossover portions 28b will be explained with reference to FIGS. 5 to 7. Here, FIGS. 5 to 7 show the crossover portions 28b cut on a plane intersecting the axial center of the stator core 15 and passing through the center of one of the tooth portions 15b, FIG. 5 showing a case where a space factor of the conductor wires 29 and the varnish 35 relative to a cross-sectional area of a crossover portion is thirty percent (30%), FIG. 6 showing a case where the space factor of the conductor wires 29 and the varnish 35 is eighty percent (80%), and FIG. 7 showing a case where the space factor of the conductor wires 29 and the varnish 35 is one hundred percent (100%). Moreover, the space factor of the conductor wires 29 and the varnish 35 is the total cross-sectional area occupied by the conductor wires 29 and the varnish 35 in a crossover portion 28 divided by the total cross-sectional area of the crossover portion 28.

In FIGS. 5 to 7, the varnish 35 integrally fixes the conductor wires 29 constituting the crossover portions 28b of the three winding phase portions. As shown in FIG. 5, because the amount of varnish 35 is too small when the space factor of the conductor wires 29 and the varnish 35 is thirty percent (30%), the conductor wires 29 constituting the crossover portions 28b in the three winding phase portions are partially fixed by the varnish 35, and a large number of gaps 36 are formed among the conductor wires 29. Furthermore, as shown in FIG. 6, when the space factor of the conductor wires 29 and the varnish 35 is eighty percent (80%), a large portion of the conductor wires 29 constituting the crossover portions 28b of the three winding phase portions are fixed by the varnish 35, and slight gaps 36 are formed in an internal portion of the crossover portions 28b. In addition, as shown in FIG. 7, when the space factor of the conductor wires 29 and the varnish 35 is one hundred percent (100%), the conductor wires 29 constituting the crossover portions 28b of the three winding phase portions is completely integrally fixed by the varnish 35, and there are no gaps 36.

Now, when the space factor of the conductor wires 29 and the varnish 35 is increased, rigidity of the coil ends 28 increases. Because the coil ends 28 are disposed so as to span two slots 15c, the more the rigidity of the coil ends 28 is increased, the more rigidity of the stator core 15 increases, resulting in increased rigidity of the stator 8 as a whole.

Figure 8:
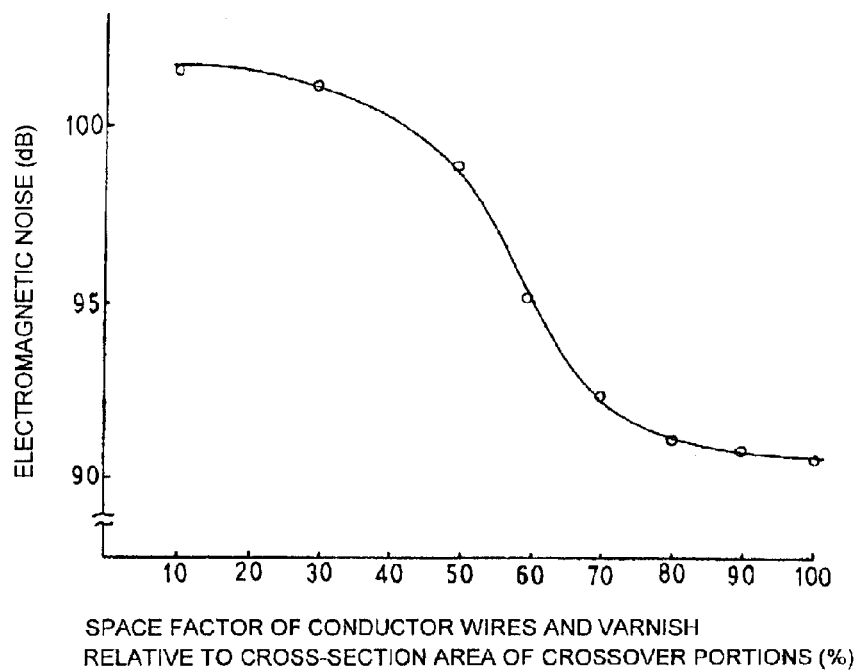
FIG. 8 is a graph showing a relationship between electromagnetic noise and a space factor of the conductor wires and the varnish relative to a cross-sectional area of a crossover portion in the automotive alternator according to Embodiment 1 of the present invention.

Next, FIG. 8 shows measured results of maximum values of electromagnetic noise when power is being generated at full load and rotational frequency is raised to 5000 rpm in an automotive alternator mounted with stators in which the space factor of the conductor wires and the varnish is varied.

It can be seen from the curve in FIG. 8 that electromagnetic noise gradually decreases as the space factor increases from ten percent (10%), decreases suddenly when the space factor is in the region from fifty percent (50%) to seventy percent (70%), decreases gradually from a space factor of seventy percent (70%), and is generally constant at a space factor of eighty percent (80%) or more. In other words, there is little improvement in the rigidity of the stator as a whole due to the application of the varnish when the space factor is fifty percent (50%) or less, and the effect of improved rigidity of the stator as a whole due to the application of the varnish becomes evident when the space factor is exceeds fifty percent (50%). Then, when the space factor is seventy percent (70%) or more, it can be seen that rigidity of the stator as a whole is sufficiently large. When the space factor is seventy percent (70%), the electromagnetic noise registers at 92 dB, and when the space factor is eighty percent (80%) or more, the electromagnetic noise is generally maintained at 91 dB.

Consequently, if the space factor is seventy percent (70%) or more, because a large portion of the conductor wires 29 constituting the crossover portions 28b is integrally fixed by the varnish 35, rigidity of the coil end groups 16f and 16r is increased, resulting in a sufficient increase in the rigidity of the stator as a whole. As a result, the radial vibration of the stator core 15 is suppressed, reducing electromagnetic noise. Furthermore, because the electromagnetic noise can be suppressed and stabilized at a low level if the space factor is eighty percent (80%) or more, it is desirable to make the space factor eighty percent (80%) or more if variable factors in the manufacturing process are considered.

As shown in FIG. 5, the smaller the space factor is, the smaller the ratio of fixed conductor wires 29 constituting the crossover portions 28b becomes, and a large number of narrow gaps constituting ventilation pathways for the cooling airflow are formed in the crossover portions 28b. Thus, wind noise resulting from the cooling airflow flowing through the narrow gaps formed in the crossover portions 28b becomes louder. However, if the space factor is seventy percent (70%) or more, because a large portion of the conductor wires 29 constituting the crossover portions 28b is fixed by the varnish 35, the narrow gaps constituting ventilation pathways for the cooling airflow are less likely to form in the crossover portions 28b, enabling generation of wind noise to be suppressed. In addition, the conductor wires 29 constituting the crossover portions 28b do not rub together due to vibration and damage the electrically-insulating coating of the conductor wires 29, thereby improving electrical insulation.

Figure 9:
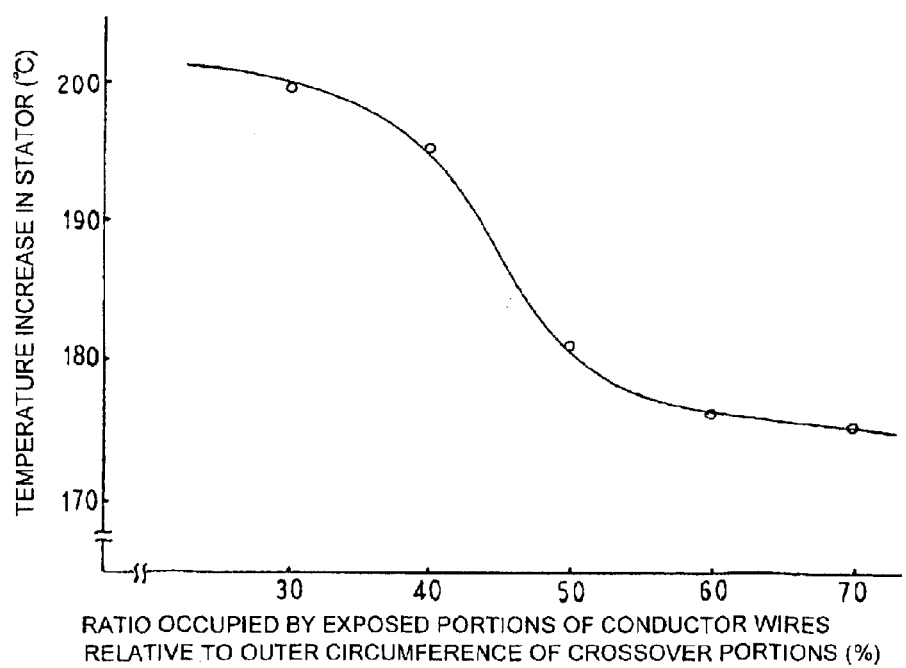
FIG. 9 is a graph showing a relationship between temperature increase in the stator and a ratio occupied by exposed portions of the conductor wires relative to an outer circumference of the crossover portion in the cross section of the crossover portion in the automotive alternator according to Embodiment 1 of the present invention.

Next, FIG. 9 shows values of temperature increase in the stator in an experiment in which power was generated at full load under stable output conditions in an automotive alternator mounted with stators in which the space factor of the conductor wires and the varnish was eighty percent (80%) and the ratio occupied by exposed portions of the conductor wires 29 relative to an outer circumference of the crossover portions 28b in the cross section of the crossover portions 28b was varied. Here, the automotive alternator was run at 3000, 3500, 4000, 4500, and 5000 rpm, the saturation temperatures of the stators were measured, and the largest value were used as the saturation temperature of the stators. The temperature increase in the stator is the difference of the saturation temperature of the stator from an experimental ambient temperature (° C.). Furthermore, the cross section of the crossover portions 28b is a cut surface cut on a plane intersecting the axial center of the stator core 15 and passing through the center of one of the tooth portions 15b. Furthermore, the exposed portions of the conductor wires 29 are the portions of the conductor wires 29 constituting the outer circumference of the crossover portions 28b in the cross section of the crossover portions 28b.

FIG. 9 shows a curve in which the values of temperature increase in the stator gradually decrease as the ratio occupied by the exposed portions of the conductor wires 29 relative to the outer circumference of the crossover portions 28b increases, decrease suddenly when the ratio exceeds forty percent (40%), decrease gradually when the ratio exceeds fifty percent (50%), and is generally constant when the ratio is sixty percent (60%) or more. In other words, when the ratio is forty percent (40%) or less, the exposed portions of the conductor wires 29 are insufficient and the heat generated in the stator winding 16 is not sufficiently dissipated from the exposed portions of the conductor wires 29 to the cooling airflow, limiting suppression of temperature increases in the stator, but when the ratio exceeds forty percent (40%), effective suppression of temperature increases in the stator becomes evident. When the ratio is fifty percent (50%) or more, the heat generated in the stator winding 16 is sufficiently dissipated from the exposed portions of the conductor wires 29 to the cooling airflow, sufficiently suppressing temperature increases in the stator. At a ratio of fifty percent (50%) or more, it can be seen that the value of the temperature increases in the stator can be suppressed to 180° C. or less. Furthermore, it can be seen that by increasing the ratio to sixty percent (60%) or more, the value of the temperature increases in the stator can be generally suppressed and stabilized at 175° C.

Thus, by setting the ratio occupied by the exposed portions of the conductor wires 29 relative to the outer circumference of the crossover portions 28b to fifty percent (50%) or more, because the heat generated in the stator winding 16 is sufficiently dissipated from the exposed portions of the conductor wires 29 to the cooling airflow, high stator winding cooling properties are ensured, and the temperature in the stator is suppressed and stabilized at a low level. Furthermore, because the values of the temperature increase in the stator can be suppressed and stabilized at a low temperature when the ratio is sixty percent (60%) or more, if variable factors in the manufacturing process are considered, it is desirable to make the ratio sixty percent (60%) or more.

Figure 13A:
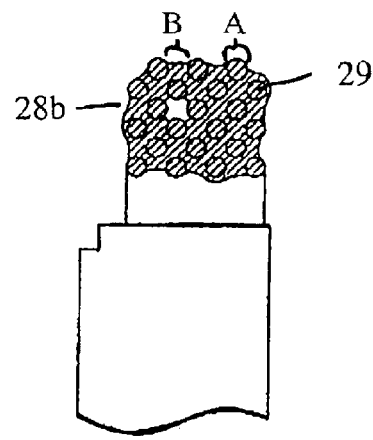
Figure 13B:
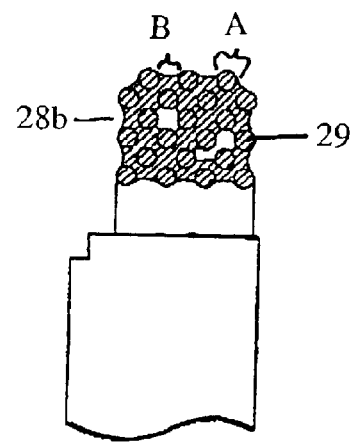
Figure 13C:
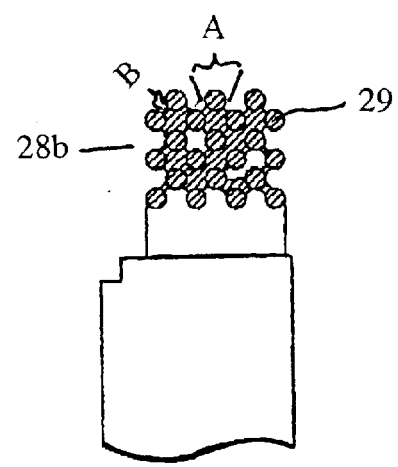

FIGS. 13A–C are cross sectional views of crossover portions showing a ratio occupied by the exposed portions A of conductor wires 29 relative to the outer circumference of a respective crossover portion 28b. The outer circumference of a crossover portion 28b is the sum of the exposed portions A of conductor wires 29 and portions B of the resin exposed on the crossover portion. From geometric relationship, the ratio of the exposed portions A to the outer circumference (A+B) of the crossover portion 28b becomes A/(A+B).

Now, a heat tolerance threshold of the stator is 260° C., and under the worst operating conditions the ambient temperature of the stator reaches 90° C. Thus, if the temperature increases in the stator at the ambient temperature of 90° C. are suppressed to 170° C. or less, the stator can be prevented from exceeding the heat tolerance threshold even under the worst operating conditions. The value of the temperature increase of 170° C. in the stator at the ambient temperature of 90° C. corresponds to the value of the temperature increase of 180° C. in the stator at the ambient temperature of 20° C. Consequently, if the ratio is set to fifty percent (50%) or more, the heat in the stator will not exceed the heat resistance threshold even under the worst operating conditions, enabling extension of the life of the stator.

Thus, by making the space factor of the varnish 35 and the conductor wires 29 constituting the crossover portions 28b relative to the cross-sectional area of the crossover portions 28b of the coil end groups 16f and 16r of the stator winding 16 seventy percent (70%) or more, and making the ratio occupied by the exposed portions of the conductor wires 29 relative to the outer circumference of the cross section of the crossover portions 28b fifty percent (50%) or more, high cooling of the stator winding 16 is ensured and rigidity of the stator as a whole is increased, enabling the provision of an automotive alternator which achieves high output and low electromagnetic noise.

Because the varnish 35 used as the electrically-insulating resin has good permeability, application of the varnish 35 to the crossover portions 28b is facilitated and the varnish 35 can be applied to the crossover portions 28b so as to expose the conductor wires 29.

Because each of the winding phase portions 30 constituting the stator winding 16 is constituted by a divided winding portion, the coil ends 28 extending outwards from the slots 15c of the winding phase portions 30 are divided in half onto each of the first and second circumferential sides. Thus, because the number of crossover portions stacked radially is substantially the same around the entire circumference at the first and second axial ends of the stator core, bonding strength between the coil ends 28 of each of the winding phase portions 30 increases, the strength of the coil end groups 16f and 16r is uniform around the entire at the first and second axial ends of the stator core, and rigidity of the stator as a whole is increased. Thus, electromagnetic noise can be reduced.

Moreover, in Embodiment 1 above, the winding phase portions 30 are each constituted by a divided winding portion installed in every third slot 15c such that strands of the conductor wire therein extend outwards from any given slot 15c, the first half extending to the first circumferential side and entering the next slot 15c three slots away on the first circumferential side, and the remaining second half thereof extending to the second circumferential side and entering the next slot 15c three slots away on the second circumferential side, but similar effects can be achieved even if the stator winding phase portions are each constituted by a wave winding installed in every third slot 15c such that strands of the conductor wire therein extend outwards from any given slot 15c, extend to the first circumferential side, and enter the next slot 15c three slots away on the first circumferential side.

Embodiment 2

In Embodiment 2, the varnish 35 is applied to the crossover portions 28b of the coil end groups 16f and 16r of the stator winding 16, and impregnated inside the slots 15c. The space factor of the varnish 35 and the conductor wires 29 constituting the crossover portions 28b relative to the cross-sectional area of the crossover portions 28b of the coil end groups 16f and 16r of the stator winding 16 is eighty percent (80%), and the ratio occupied by the exposed portions of the conductor wires 29 relative to the outer circumference of the cross section of the crossover portions 28b is sixty percent (60%). Moreover, the rest of the embodiment is constructed in a similar manner to Embodiment 1 above.

Consequently, in Embodiment 2, in a similar manner to Embodiment 1 above, high cooling of the stator winding 16 is ensured and rigidity of the stator as a whole is increased, enabling the provision of an automotive alternator which achieves high output and low electromagnetic noise.

In Embodiment 2, because the varnish 35 impregnates inside each of the slots 15c, the slot-housed portions 30a of each of the winding phase portions 30 of the stator winding 16 are fixed to the slots 15c, further increasing the rigidity of the stator as a whole, and further reducing electromagnetic noise. Furthermore, damage to the electrically-insulating coating on the conductor wire 29 resulting from the conductor wire 29 constituting the slot-housed portions 30a rubbing against an inner wall surface of the slots 15c is suppressed, and with-stand voltage between the stator core 15 and the stator winding 16 increases, that is, electrical insulation is also improved. In addition, the varnish 35 that has impregnated inside each of the slots 15c acts as a damping member to damp the vibration of the stator core 15, enabling electromagnetic noise to be lowered.

Embodiment 3

In Embodiment 3, a silicone resin functioning as the electrically-insulating resin is applied to the crossover portions 28b of the coil end groups 16f and 16r of the stator winding 16. The space factor of the silicone resin and the conductor wires 29 constituting the crossover portions 28b relative to the cross-sectional area of the crossover portions 28b of the coil end groups 16f and 16r of the stator winding 16 is eighty percent (80%), and the ratio occupied by the exposed portions of the conductor wires 29 relative to the outer circumference of the cross section of the crossover portions 28b is sixty percent (60%). Moreover, the rest of the embodiment is constructed in a similar manner to Embodiment 1 above.

Consequently, in Embodiment 3, in a similar manner to Embodiment 1 above, high cooling of the stator winding 16 is ensured and rigidity of the stator as a whole is increased, enabling the provision of an automotive alternator which achieves high output and low electromagnetic noise.

In Embodiment 3, because the silicone resin applied the crossover portions 28b of the coil end groups 16f and 16r acts as a damper, vibration is damped, enabling electromagnetic noise to be lowered.

Embodiment 4

In Embodiment 4, an epoxy resin functioning as the electrically-insulating resin is applied to the crossover portions 28b of the coil end groups 16f and 16r of the stator winding 16. The space factor of the epoxy resin and the conductor wires 29 constituting the crossover portions 28b relative to the cross-sectional area of the crossover portions 28b of the coil end groups 16f and 16r of the stator winding 16 is eighty percent (80%), and the ratio occupied by the exposed portions of the conductor wires 29 relative to the outer circumference of the cross section of the crossover portions 28b is sixty percent (60%). Moreover, the rest of the embodiment is constructed in a similar manner to Embodiment 1 above.

Consequently, in Embodiment 4, in a similar manner to Embodiment 1 above, high cooling of the stator winding 16 is ensured and rigidity of the stator as a whole is increased, enabling the provision of an the automotive alternator which achieves high output and low electromagnetic noise.

In Embodiment 4, because the conductor wires 29 constituting the crossover portions 28b of the coil end groups 16f and 16r are firmly fixed by the epoxy resin, the rigidity of the coil end groups 16f and 16r is further increased. As a result, the rigidity of the stator as a whole increases, enabling electromagnetic noise to be lowered further.

Embodiment 5

Figure 10:
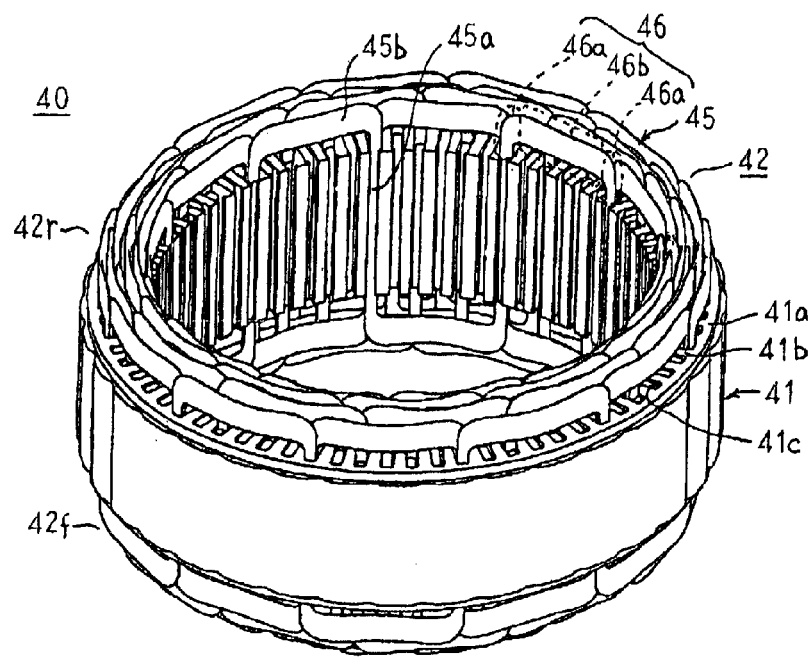
FIG. 10 is a perspective showing a stator used in an automotive alternator according to Embodiment 5 of the present invention.
Figure 11:
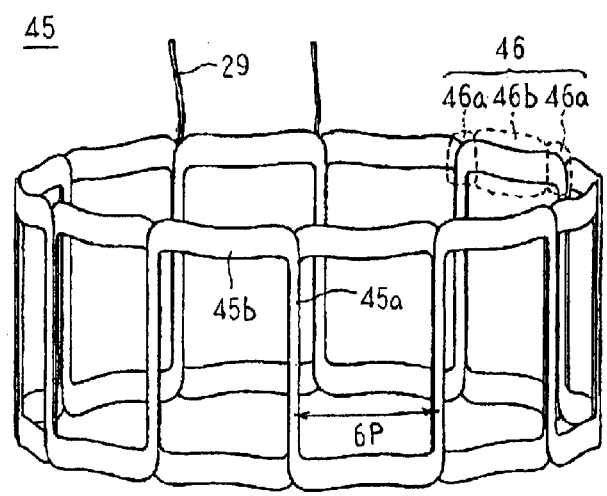
FIG. 11 is a perspective schematically showing one winding phase portion constituting a stator winding of the automotive alternator according to Embodiment 5 of the present invention.
Figure 12:
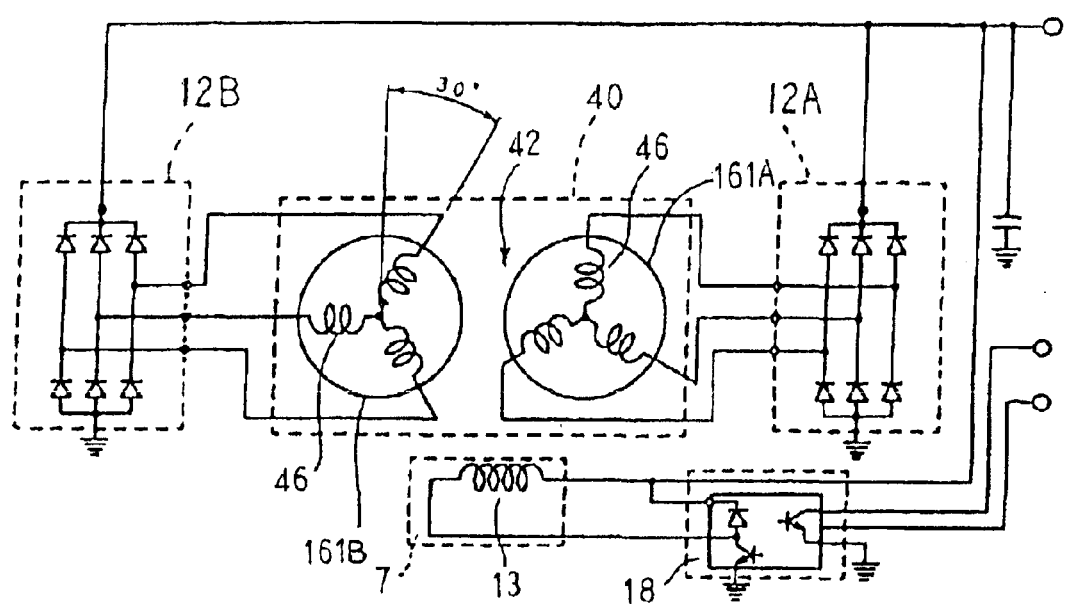
FIG. 12 is a circuit diagram of the automotive alternator according to Embodiment 5 of the present invention.

FIG. 10 is a perspective showing a stator used in an automotive alternator according to Embodiment 5 of the present invention, FIG. 11 is a perspective schematically showing one winding phase portion constituting a stator winding of the stator used in the automotive alternator according to Embodiment 5 of the present invention, and FIG. 12 is a circuit diagram of the automotive alternator according to Embodiment 5 of the present invention.

In FIG. 10, a stator 40 is constituted by: a cylindrical stator core 41 prepared by laminating a predetermined number of sheets of a magnetic steel plate; and a stator winding 42 installed in the stator core 41. The stator core 41 includes: a cylindrical base portion 41a; a plurality of tooth portions 41b formed on an inner circumferential surface of the base portion 41a at an even angular pitch in a circumferential direction, each of the tooth portions 41b being disposed so as to extend from the inner circumferential surface of the base portion 41a toward an axial center; and a plurality of slots 41c extending axially defined by the base portion 41a and adjacent pairs of the tooth portions 41b. Furthermore, there are seventy-two slots 41c formed on the stator core 41. Here, because the number of magnetic poles in the rotor 7 is twelve, the number of slots per phase per pole is two.

The stator winding 42 is constituted by six winding phase portions 45 each formed by winding a conductor wire 29 into a wave shape in every sixth slot 41c, the conductor wire 29 being composed of a copper wire material having a circular cross section coated with electrical insulation. Furthermore, the winding phase portions 45 are installed in the stator core 41 such that the slots 41c in which each winding phase portion 45 is installed are offset by one slot from those of each of the other winding phase portions 45.

The winding phase portions 45 are each constructed into a wave winding in which the conductor wire 29 is wound for a predetermined number of winds, the winding phase portions 45 each being formed into a divided winding portion having a wave-shaped pattern composed of twelve slot-housed portions 45a disposed at a pitch of six slots in a circumferential direction and linking portions 45b linking together a first half of end portions of adjacent pairs of the slot-housed portions 45a alternately at first and second axial ends and linking together a remaining second half of the end portions alternately at the first and second axial ends, as shown in FIG. 11. The winding phase portions 45 are installed in the stator core 41 such that the slot-housed portions 45a are housed in corresponding slots 45c disposed at a pitch of six slots in a circumferential direction.

The six winding phase portions 45 are installed in the stator core 41 such that the slots 41c in which each winding phase portion 45 is installed are offset by a pitch of one slot (1P) in a circumferential direction from those of each of the other winding phase portions 45 and the six winding phase portions 45 are stacked into six layers radially.

Here, in each of the winding phase portions 45, coil ends 46 are constituted by the linking portions 45b and are formed by extended portions 46a composed of portions of the conductor wire 29 extending outwards from the slots 41c, and crossover portions 46b composed of portions of the conductor wire 29 extending in a circumferential direction and linking the extended portions 46a extending outwards from pairs of slots 41c six slots apart. The crossover portions 46b of the coil ends 46 of the winding phase portions 45 are stacked radially and arranged circumferentially to constitute front-end and rear-end coil end groups 42f and 42r of the stator winding 42. In addition, a varnish is applied to the crossover portions 46b of the coil end groups 42f and 42r. Thus, strands of the conductor wire 29 constituting the crossover portions 46b are integrally fixed, and the radially-stacked crossover portions 46b are integrally fixed together.

Three winding phase portions 45 installed in this manner are formed into a Y-connection (an alternating-current connection), constituting a first three-phase alternating-current winding 161A functioning as a polyphase alternating-current winding, and the remaining three winding phase portions 45 are formed into a Y-connection (an alternating-current connection), constituting a second three-phase alternating-current winding 161B functioning as a polyphase alternating-current winding. The first and second three-phase alternating-current windings 161A and 161B are connected to first and second rectifiers 12A and 12B, respectively, constituting the electrical circuit shown in FIG. 12. Furthermore, the three winding phase portions 45 constituting the first three-phase alternating-current winding 161A are each given a phase difference corresponding to an electrical angle of 60°, and the three winding phase portions 45 constituting the second three-phase alternating-current winding 161B are each given a phase difference corresponding to an electrical angle of 60°. In addition, the winding phase portions 45 constituting the second three-phase alternating-current winding 161B are given a phase difference corresponding to an electrical angle of 30° relative to the winding phase portions 45 constituting the first three-phase alternating-current winding 161A.

Moreover, the rest of the embodiment is constructed in a similar manner to Embodiment 1 above.

In Embodiment 5, the stator winding 42 is constituted by the first and second three-phase alternating-current windings 161A and 161B. A rotating magnetic field is applied to the stator core 41, generating electromotive forces in the first and second three-phase alternating-current windings 161A and 161B of the stator winding 42. The alternating electromotive forces generated in the first and second three-phase alternating-current windings 161A and 161B are converted into direct currents by the first and second rectifiers 12A and 12B, respectively, and the magnitudes of the output voltages thereof are adjusted by the regulator 18. Then, the outputs from the rectifiers 12A and 12B are combined, recharging the battery.

In Embodiment 5 also, by applying the varnish to the crossover portions 46b so as to make the space factor of the varnish and the conductor wires 29 constituting the crossover portions 46b relative to a cross-sectional area of the crossover portions 46b of the coil end groups 42f and 42r of the stator winding 42 seventy percent (70%) or more, and to make the ratio occupied by exposed portions of the conductor wires 29 relative to an outer circumference of the cross section of the crossover portions 46b fifty percent (50%) or more, an automotive alternator can be provided which achieves high output and low electromagnetic noise in a similar manner to Embodiment 1 above.

In Embodiment 5, because the slots 41c are formed at a ratio of two per phase per pole, the number of slots 41c is twice that of Embodiment 1. Consequently, the number of coil ends 46 disposed so as to span the slots 41*c* doubles, further increasing rigidity of the stator as a whole and enabling electromagnetic noise to be lowered.

In Embodiment 5 above, the varnish may also be impregnated inside the slots 41*c*. In that case, the slot-housed portions 45*a* of each of the winding phase portions 45 of the stator winding 42 are fixed to the slots 41*c* by the varnish, further increasing the rigidity of the stator as a whole, and further reducing electromagnetic noise. Furthermore, damage to the electrically-insulating coating on the conductor wire 29 resulting from the conductor wire 29 constituting the slot-housed portions 45*a* rubbing against an inner wall surface of the slots 41*c* is suppressed, and with-stand voltage between the stator core 41 and the stator winding 42 increases. In addition, the varnish that has impregnated inside each of the slots 41*c* acts as a damping member to damp the vibration of the stator core 41, enabling electromagnetic noise to be lowered. The greater number of slots 41*c* makes the effects described above proportionately more evident.

Moreover, each of the above embodiments has been explained with reference to stator cores in which the number of slots per phase per pole is one or two, but similar effects can also be achieved if the present invention is applied to a stator core in which the number of slots per phase per pole is three or more.

Each of the above embodiments has been explained as applying to an automotive alternator of the type in which the field winding 13 is installed in the pole cores 20 and 21 so as to be covered by the claw-shaped magnetic poles 22 and 23 and rotate with the claw-shaped magnetic poles and the field current is supplied to the field winding through the brushes 10, but similar effects will also be exhibited if the present invention is applied to a brushless automotive alternator in which a field winding is secured to a bracket and a rotating magnetic field is supplied to a stator through air gaps.

The present invention is constructed in the above manner and exhibits the effects described below.

According to one aspect of the present invention, there is provided an automotive alternator including:

a shaft rotatably supported in a case;
a rotor fixed to the shaft;
a stator provided with:
a cylindrical stator core supported in the case so as to envelop the rotor, a plurality of slots extending axially being formed in the stator core so as to line up circumferentially; and
a stator winding composed of a polyphase alternating-current winding installed in the stator core; and
a cooling fan fixed to at least one axial end portion of the rotor, the polyphase alternating-current winding being constituted by winding phase portions each being constructed by winding a conductor wire for a predetermined number of turns into a wave shape in the slots at intervals of a predetermined number of slots so as to extend outwards from first slots at an end surface of the stator core, extend in a circumferential direction, and enter second slots the predetermined number of slots away, the conductor wire being formed by coating an electrical conductor with electrical insulation, slots in which each of the winding phase portions is installed being offset by one slot from slots in which other of the winding phase portions are installed, coil ends of the winding phase portions each being constituted by extended portions composed of portions of the conductor wire extending outwards at an end surface of the stator core from a pair of the slots the predetermined number of slots apart, and a crossover portion composed of a portion of the conductor wire extending in a circumferential direction and linking the extended portions extending outwards at the end surface of the stator core from the pair of the slots the predetermined number of slots apart, a coil end group of the stator winding being constructed by arranging the coil ends of the winding phase portions circumferentially such that the crossover portions overlap radially, and an electrically-insulating resin being applied to the crossover portions so as to fix together the radially-overlapping crossover portions, wherein a space factor of the conductor wires and the electrically-insulating resin relative to a cross-sectional area of the crossover portions in a cross section of the crossover portions relative to a plane including an axial center of the stator core is seventy percent (70%) or more, and a ratio occupied by exposed portions of the conductor wires relative to an outer circumference of the crossover portions in the cross section of the crossover portions is fifty percent (50%) or more, whereby an automotive alternator is provided in which rigidity of the stator as a whole is increased while also ensuring cooling of the stator, thereby suppressing temperature increases in the stator, and enabling electromagnetic noise to be lowered.

The electrically-insulating resin may be impregnated inside the slots, increasing rigidity of the stator as a whole, thereby enabling electromagnetic noise to be lowered, and improving electrical insulation between the stator winding and the stator core within the slots.

The electrically-insulating resin may be a varnish, facilitating the operation of applying the electrically-insulating resin.

The electrically-insulating resin may be a silicone resin, whereby the electrically-insulating resin acts as a damper, damping vibration and lowering electromagnetic noise.

The slots may be formed at a ratio of two per phase per pole, the polyphase alternating-current winding being constituted by two three-phase alternating-current windings each formed by connecting three of the winding phase portions into an alternating-current connection, increasing the number of coil ends disposed so as to span the slots, thereby increasing rigidity of the stator as a whole and lowering electromagnetic noise.

Each of the winding phase portions may be formed into a divided winding portion, whereby the number of crossover portions stacked radially is substantially the same around the entire circumference at the first and second axial ends of the stator core, increasing bonding strength between the coil ends of each of the winding phase portions, and making the entire circumference at the first and second axial ends of the stator core uniform. As a result, rigidity of the stator as a whole can be increased.

What is claimed is:

1. An automotive alternator comprising:
a shaft rotatably supported in a case;
a rotor fixed to said shaft;
a stator provided with;
a cylindrical stator core supported in said case so as to envelop said rotor, a plurality of slots extending axially being formed in said stator core so as to line up circumferentially; and
a stator winding composed of a polyphase alternating-current winding installed in said stator core; and a cooling fan fixed to at least one axial end portion of said rotor, said polyphase alternating-current winding being constituted by winding phase portions each being constructed by winding a conductor wire for a predetermined number of turns into a wave shape in said slots at intervals of a predetermined number of slots so as to extend outwards from first slots at an end surface of said stator core, extend in a circumferential direction, and enter second slots said predetermined number of slots away, said conductor wire being formed by coating an electrical conductor with electrical insulation, slots in which each of said winding phase portions is installed being offset by one slot from slots in which other of said winding phase portions are installed, coil ends of said winding phase portions each being constituted by extended portions composed of portions of said conductor wire extending outwards at an end surface of said stator core from a pair of said slots said predetermined number of slots apart, and a crossover portion composed of a portion of said conductor wire extending in a circumferential direction and linking said extended portions extending outwards at said end surface of said stator core from said pair of said slots said predetermined number of slots apart, a coil end group of said stator winding being constructed by arranging said coil ends of said winding phase portions circumferentially such that said crossover portions overlap radially, and an electrically-insulating resin being applied to said crossover portions so as to fix together said radially-overlapping crossover portions, wherein a space factor of area occupied by said conductor wires and said electrically-insulating resin relative to a cross-sectional area of said crossover portions, in a cross section of said crossover portions as defined by a plane including an axial center of said stator core, is seventy percent (70%) or more, and a ratio of an amount of an outer circumference of said cross-sectional portions that is occupied by exposed portions of said conductor wires relative to the outer circumference of said crossover portions in said cross section is fifty percent (50%) or more.

2. The automotive alternator according to claim 1 wherein said electrically-insulating resin is impregnated inside said slots.

3. The automotive alternator according to claim 1 wherein said electrically-insulating resin is a varnish.

4. The automotive alternator according to claim 1 wherein said electrically-insulating resin is a silicone resin.

5. The automotive alternator according to claim 1 wherein said slots are formed at a ratio of two per phase per pole, said polyphase alternating-current winding being constituted by two three-phase alternating-current windings each formed by connecting three of said winding phase portions into an alternating-current connection.

6. The automotive alternator according to claim 1 wherein each of said winding phase portions is formed into a divided winding portion.

* * * * *